(12) United States Patent
Ayers et al.

(10) Patent No.: US 6,915,484 B1
(45) Date of Patent: Jul. 5, 2005

(54) TEXT REFLOW IN A STRUCTURED DOCUMENT

(75) Inventors: Robert M. Ayers, Palo Alto, CA (US); Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 851 days.

(21) Appl. No.: 09/635,999

(22) Filed: Aug. 9, 2000

(51) Int. Cl.⁷ .......................... G06F 17/21; G06F 17/22; G06F 17/25
(52) U.S. Cl. .................. 715/517; 715/513; 715/518; 715/530; 715/619; 715/660; 715/666
(58) Field of Search ................................. 715/513, 517, 715/518, 530, 619, 660, 666; 345/619, 660, 666

(56) References Cited

U.S. PATENT DOCUMENTS

| | | | | |
|---|---|---|---|---|
| 4,723,209 A | * | 2/1988 | Hernandez et al. | 715/521 |
| 5,031,121 A | * | 7/1991 | Iwai et al. | 715/515 |
| 5,467,448 A | * | 11/1995 | Hilton et al. | 715/520 |
| 5,633,996 A | * | 5/1997 | Hayashi et al. | 715/513 |
| 5,819,300 A | * | 10/1998 | Kohno et al. | 715/511 |
| 5,845,303 A | * | 12/1998 | Templeman | 715/517 |
| 5,893,127 A | * | 4/1999 | Tyan et al. | 715/513 |
| 5,978,819 A | * | 11/1999 | Berstis | 715/513 |
| 6,596,032 B2 | * | 7/2003 | Nojima et al. | 715/517 |
| 6,687,876 B1 | * | 2/2004 | Schilit et al. | 715/512 |
| 2002/0021308 A1 | * | 2/2002 | White et al. | 345/800 |

OTHER PUBLICATIONS

BCL's SimplEBook Opens ebooks to the Web, Jul. 25, 2000, Business Wire.*
Magellan 4.2 User Manual, 2000, BCL Computers.*
Microsoft Word 2000, 1999, Microsft Corporation, Version 9.0.6926 SP–3.*

* cited by examiner

Primary Examiner—Heather R. Herndon
Assistant Examiner—Joshua D Campbell
(74) Attorney, Agent, or Firm—Fish & Richardson P.C.

(57) ABSTRACT

A method and computer program product for reflowing a PDL page without using the original application used to create the PDL page. The method and computer program product include receive a page represented in a page description language, the page including a plurality of page objects, and changing one or both of a size of the page and a size of one or more of the page objects, while maintaining spatial relationships between the page objects.

20 Claims, 10 Drawing Sheets

FIG. 2

"I don't know, aunt."

"Well, I know. It's jam -- that's what it is. Forty times I've said if you didn't let that jam alone I'd skin you. Hand me that switch."

The switch hovered in the air -- the peril was desperate.

"My! Look behind you, aunt!"

The old lady whirled round, and snatched her skirts out of danger. The lad fled on the instant, scrambled up the high board-fence, and disappeared over it.

His aunt Polly stood surprised a moment, and then broke into a gentle laugh.

FIG. 3

"I don't know, aunt."

"Well, I know. It's jam -- that's what it is. Forty times I've said if you didn't let that jam alone I'd skin you. Hand me that switch."

The switch hovered in the air -- the peril was desperate.

"My! Look behind you, aunt!"

The old lady whirled round, and snatched her skirts out of danger. The lad fled on the instant, scrambled up the high board-fence, and disappeared over it.

His aunt Polly stood surprised a moment, and then broke into a gentle laugh.

a different PDF page for each display size using the application that created the PDF page. This approach is wasteful because multiple copies of each PDF page must be maintained. In addition, the user must select the copy that is appropriate for the display on which the PDF page will be viewed.

TEXT REFLOW IN A STRUCTURED DOCUMENT

BACKGROUND OF THE INVENTION

The present invention relates generally to a system and method for generating output for computer systems, and more particularly to a system and method for modifying the presentation of structured documents.

The rapid expansion of the World Wide Web—where dynamic, compelling images are crucial—has driven the demand for a document format that preserves all of the fonts, formatting, colors, and graphics of any source document, regardless of the application and platform used to create it.

One such format is referred to as the portable document format (PDF). PDF is a file format developed by Adobe Systems, Incorporated. PDF captures formatting information from a variety of desktop publishing applications, making it possible to send formatted documents and have them appear on the recipient's monitor or printer as they were intended.

A source document can be authored in a page description language (PDL). PDL is a language for describing the layout and contents of a printed page. One well-known PDL is PostScript™ by Adobe Systems, Inc. PostScript describes a page in terms of page objects including textual objects and graphical objects such as lines, arcs, and circles. Moreover, PDF is a PDL.

According to conventional methods, a PDL document is rendered by first defining a bounding box, such as a page, and then placing the textual and graphical objects defined for the page into the bounding box according to the definitions in the PDL document. Normally the size of a PDL page is chosen so that it is clearly legible on a standard full-sized display. For example, an 8-inch page width may be chosen for display on a 15-inch computer monitor.

However, a single page size may not be ideal for devices having non-standard display sizes, such as a hand-held personal digital assistant (PDA). To view a PDL page having an 8-inch page width on a 3-inch-wide display, the user has two alternatives. The user can change the zoom factor of the display to show the entire page on the 3-inch display. However, this approach will generally render the page too small to be legible. Alternatively, the user can simply show a portion of the page at full magnification, and scroll horizontally and vertically to view the rest of the page. This approach is inconvenient and time-consuming.

Another approach is for the author of the PDL page to generate a different PDL page for each display size using the application that created the PDL page. This approach is wasteful because multiple copies of each PDL page must be maintained. In addition, the user must select the copy that is appropriate for the display on which the PDL page will be viewed.

SUMMARY OF THE INVENTION

In general, in one aspect, the invention features a method and computer program product for reflowing a PDL page without using the original application used to create the PDL page. One use of the present invention is to resize a page for viewing on a display of a different size than the display to which the document was originally rendered, or to display at a different resolution, either because the inherent resolution of the display differs, or because the reader has demanded a larger, more visible representation.

In one aspect the method and computer program product include receiving a page represented in a page description language, the page including a plurality of page objects; and changing a size of the page to a changed size in a first dimension without changing the size of the page objects, while maintaining spatial relationships between the page objects in a second dimension.

Particular implementations can include one or more of the following features. The page objects can include textual and graphical elements, and the changing step includes maintaining spatial relationships between the textual and graphical elements in the second dimension. The changing step can further include creating one or more new pages having the changed size in the first dimension; and adding the textual and graphical elements to the one or more new pages. The adding step can include identifying distances in the second dimension between one or more textual elements and one or more graphical elements; adding the textual elements to the one or more new pages; and adding the graphical elements to the one or more new pages based on the distances in the second dimension and positions of the textual elements in the one or more new pages. The identifying step can include creating a map containing the positions of the textual elements in the page, and augmenting the map with the positions of the textual elements in the one or more new pages to produce a relationship for each textual element between the position of the textual element in the page and the position of the textual element in the one or more new pages; and the step of adding the graphical elements can include adding the graphical elements to the one or more new pages according to the map. The step of adding the graphical elements according to the map can include associating one or more particular textual elements with one or more particular graphical elements; determining distances in the second dimension between the particular textual elements and the particular graphical elements; and selecting positions in the one or more new pages for placement of the particular graphical elements based on the distances and the positions of the particular textual elements in the one or more new pages as listed in the map. The associating step can include associating a particular graphical element with a particular textual element that is nearest to the particular graphical element in the first dimension. The associating step can include associating a given graphical element with a plurality of given textual elements; and the selecting step can include scaling the given graphical element when a distance in the first dimension between the plurality of given textual elements in the page differs from a corresponding distance between the plurality of given textual elements in the one or more new pages. The textual elements can be organized as words.

In another aspect the method and computer program product include receiving a page represented in a page description language, the page including a plurality of page objects; and changing a size of the page objects without changing the size of the page, while maintaining spatial relationships between the page objects in a dimension of the page. The page objects can include textual and graphical elements, and the changing step can include maintaining spatial relationships between the textual and graphical elements in the dimension. The changing step can include creating one or more new pages having the same size as the page in a further dimension; scaling the textual and graphical elements, producing scaled textual and graphical elements; and adding the scaled textual and graphical elements to the one or more new pages. The adding step can include identifying distances in the dimension between one or more textual elements and one or more graphical elements; adding the scaled textual elements to the one or more new pages; and adding the scaled graphical elements to the one or more new pages based on the distances in the dimension and the positions of the scaled textual elements in the one or more new pages. The identifying step can include creating a map containing the positions of the textual elements in the page, and augmenting the map with the positions of the textual elements in the one or more new pages to produce a relationship for each textual element between the position of the textual element in the page and the position of the corresponding scaled textual element in the one or more new pages; and the step of adding the graphical elements can include adding the graphical elements to the one or more new pages according to the map. The step of adding the scaled graphical elements according to the map can include associating one or more particular textual elements with one or more particular graphical elements; determining distances in the dimension between the particular textual elements and the particular graphical elements; and selecting positions in the one or more new pages for placement of the scaled graphical elements corresponding to the particular graphical elements based on the distances and the positions of scaled textual elements corresponding to the particular textual elements in the one or more new pages as listed in the map. The associating step can include associating a particular graphical element with a particular textual element that is nearest to the particular graphical element in the further dimension. The associating step can include associating a given graphical element with a plurality of given textual elements; and the selecting step can include scaling the given graphical element in the dimension when a distance in the dimension between the plurality of given textual elements in the page differs from a corresponding distance in the one or more new pages between a plurality of scaled textual elements corresponding to the plurality of given textual elements. The textual elements can be organized as words.

In another aspect the method and computer program product include receiving a page represented in a page description language, the page including a plurality of page objects; and changing a size of the page to a changed size in a first dimension, and changing a size of one or more of the page objects, while maintaining spatial relationships between the page objects in a second dimension. The page objects include textual and graphical elements, and wherein the changing step can include maintaining spatial relationships between the textual and graphical elements in the second dimension. The changing step can include creating one or more new pages having the same size as the page in a further dimension; scaling the textual and graphical elements, producing scaled textual and graphical elements; and adding the scaled textual and graphical elements to the one or more new pages. The adding step can include identifying distances in the second dimension between one or more textual elements and one or more graphical elements; adding the scaled textual elements to the one or more new pages; and adding the scaled graphical elements to the one or more new pages based on the distances in the second dimension and positions of the textual elements in the one or more new pages. The identifying step can include creating a map containing the positions of the textual elements in the page, and augmenting the map with the positions of the textual elements in the one or more new pages to produce a relationship for each textual element between the position of the textual element in the page and the position of the corresponding scaled textual element in the one or more new pages; and the step of adding the graphical elements can include adding the graphical elements to the one or more new pages according to the map. The step of adding the graphical elements according to the map can include associating one or more particular textual elements with one or more particular graphical elements; determining distances in the second dimension between the particular textual elements and the particular graphical elements; and selecting positions in the one or more new pages for placement of the scaled graphical elements corresponding to the particular graphical elements based on the distances and the positions of scaled textual elements corresponding to the particular textual elements in the one or more new pages as listed in the map. The associating step can include associating a particular graphical element with a particular textual element that is nearest to the particular graphical element in the first dimension. The associating step can include associating a given graphical element with a plurality of given textual elements; and the selecting step can include scaling the given graphical element when a distance in the dimension between the plurality of given textual elements in the page differs from a corresponding distance in the one or more new pages between a plurality of scaled textual elements corresponding to the plurality of given textual elements. The textual elements can be organized as words. The amount of size change of a page object can depend on the type of the page object.

In general, in one aspect, the invention features a method and computer program product for forming illustrations in a page. It includes receiving a page represented in a page description language (PDL), the page including a plurality of page objects including line art elements, each page object associated with a PDL element range including at least one PDL element; repeatedly augmenting each PDL range with a PDL element that is adjacent to the PDL range and is not part of another PDL range when the bounding box of the PDL element overlaps the bounding box of the PDL object associated with the PDL range; such that the PDL elements in each PDL range define an illustration. Particular implementations can include combining two illustrations when their PDL ranges are adjacent and their bounding boxes overlap.

In another aspect the method and computer program product include receiving a page represented in a page description language (PDL), the page including a plurality of page objects including line art elements, each page object associated with a PDL element range including at least one PDL element; recursively coalescing line art elements having overlapping bounding boxes to form one or more illustrations; adding to each illustration each PDL element within the PDL range of the illustration that is not part of the illustration when the bounding box of the PDL element overlaps the bounding box of the illustration; and repeatedly augmenting the PDL range of each illustration with PDL elements that are adjacent to the PDL range and are not part of another illustration when the bounding box of the PDL elements overlap the bounding box of the illustration; such that the PDL elements in each PDL range define an illustration. Particular implementations can include combining two illustrations when their PDL ranges are adjacent and their bounding boxes overlap. The step of recursively coalescing can include combining two line art elements having overlapping bounding boxes, thereby forming an illustration; and creating a new bounding box containing the illustration. Particular implementations can include combining a line art element with the illustration when the bounding boxes of the line art element and the illustration overlap.

Advantages that can be seen in implementations of the invention include one or more of the following. PDL pages can be resized. A PDL page produced according to the invention can be legibly displayed on any size display.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 depicts a conventional PDL page.

FIG. 3 depicts a PDL page resulting from the operation of one implementation of the present invention.

Like reference numbers and designations in the various drawings indicate like elements.

DETAILED DESCRIPTION

The present invention can be implemented in a raster image processor (RIP). This implementation is described with reference to FIG. 1.

Figure 1:
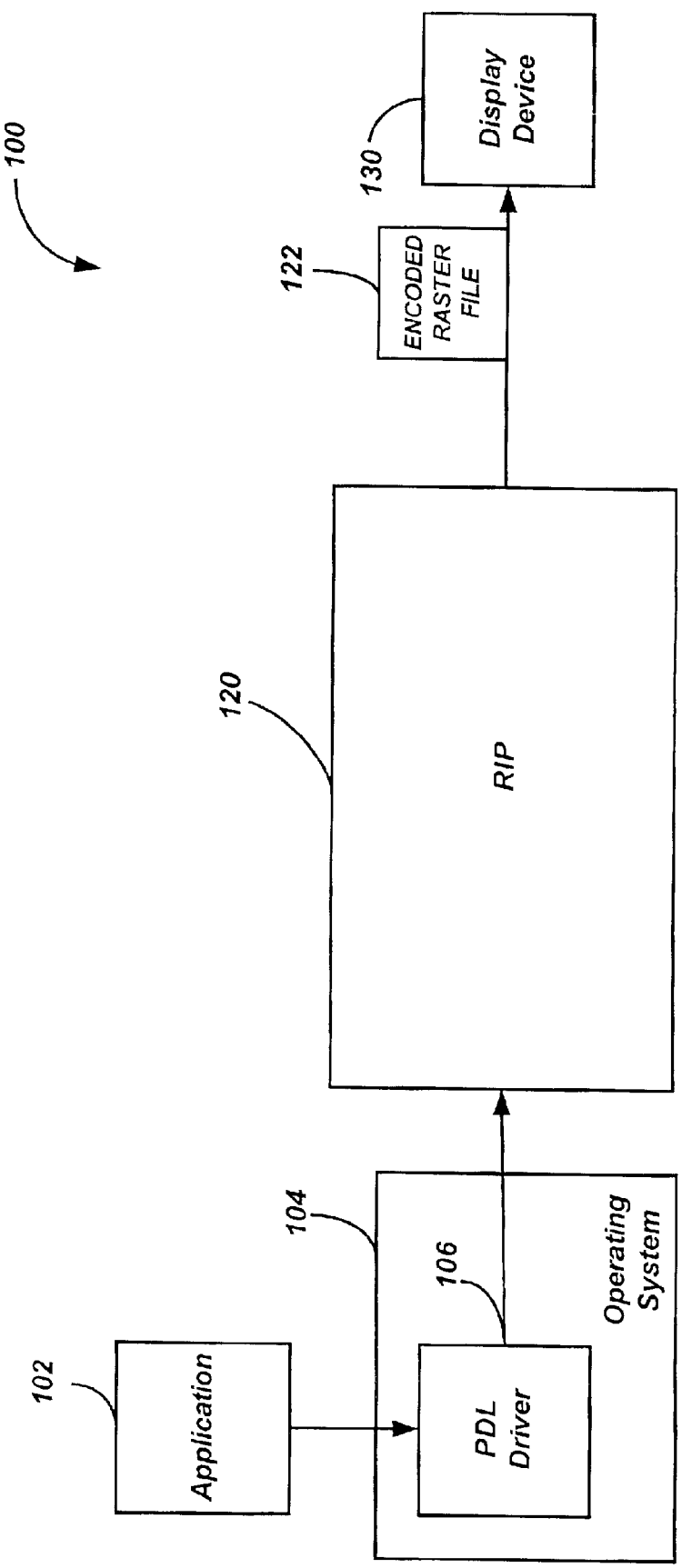
FIG. 1 is a block diagram of a computing system for displaying a document.

FIG. 1 is a block diagram of a computing system 100 for displaying a document. In system 100, an application 102, such as a word processor, generates a request to display a page in response to a user selection. The request is sent to an operating system 104, such as Windows™, using an operating system call. The operating system 104 in turn directs the request to a page description language (PDL) driver 106. The driver 106 translates the operating system calls and generates a data stream that is sent to RIP 120. RIP 120 operates to generate an encoded raster file 122. The encoded raster file is sent to display device 130 for display.

The implementation described below changes only the page width, and not the size of the page objects. In another implementation, only the size of the page objects is changed. In yet another implementation, both the page width and the size of the page objects are changed. In variations of these implementations, it is the page length that is changed, rather than the page width. These variations are especially useful for languages that are written from top to bottom, rather than from left to right. The textual elements can be organized as characters, words and the like.

FIG. 2 shows a conventional PDL page 202. The page includes textual elements 206 and graphical elements 208 and 210. The page has a page width 220. Each graphical element in a page is associated with one or more textual elements in the page. Graphical element 208 spans several lines of text. Therefore, it is associated with two textual elements 212 ("I") and 214 ("desperate"). For convenience, textual elements 212 and 214, referred to as "anchors," are shown in bold type. Graphical element 210 spans only a single line. Therefore, it is associated with a single anchor 216 ("My").

FIG. 3 shows a PDL page 302 after application of the reflow process of the present invention. The width of the original PDL page 202 is changed while the font size of a textual element 206 remains constant. Referring to FIGS. 2 and 3, the page width 320 of new page 302 is chosen to be narrower than the page width 220 of original page 202. Accordingly, the length of the page increases. When referring to a PDL page, the horizontal dimension is referred to as its X-axis and the vertical dimension is referred to as the Y-axis. Thus, it is the distance in the Y-axis that increases. In this implementation, the graphical elements are moved and stretched to follow their anchors.

The Y-axis position of anchor 216 has also increased. Therefore, the Y-axis position of associated graphical element 210 is also increased so that anchor 216 and graphical element 210 are aligned on the Y-axis. In addition, the Y-axis distance between anchors 212 and 214 has increased. Therefore, corresponding graphical element 208 is stretched to span the distance between anchors 212 and 214.

Figure 4:
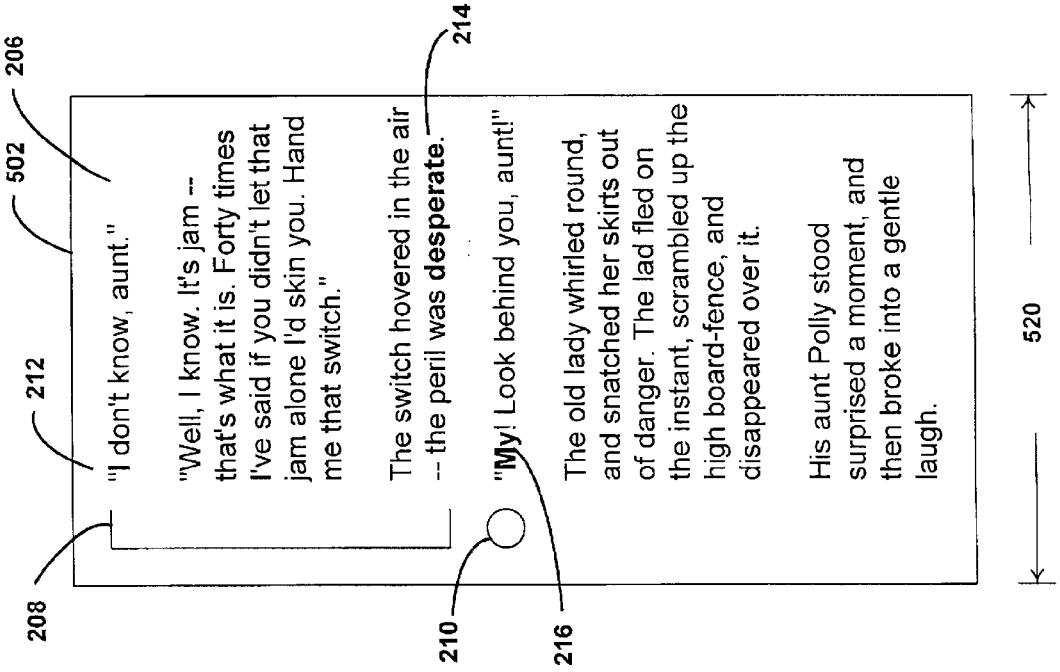
FIG. 4 depicts a PDL page resulting from the operation of another implementation of the present invention.

FIG. 4 shows a PDL page 402 resulting from the operation of another implementation of the present invention. In this implementation, the width of the PDL page remains constant while the font size of its textual elements is increased. Referring to FIGS. 2 and 4, the page width 420 of page 402 is the same as the page width 220 of page 202 (FIG. 2). However, the font size of the textual elements 206 has been increased from 12 points to 14 points. Therefore, the length of the page 402 is greater than the length of page 202.

The Y-axis position of anchor 216 has also increased. Therefore, the Y-axis position of associated graphical element 210 is increased so that anchor 216 and graphical element 210 are aligned on the Y-axis. In addition, the Y-axis distance between anchors 212 and 214 has increased. Therefore, corresponding graphical element 208 is stretched to span the distance between anchors 212 and 214.

Figure 5:
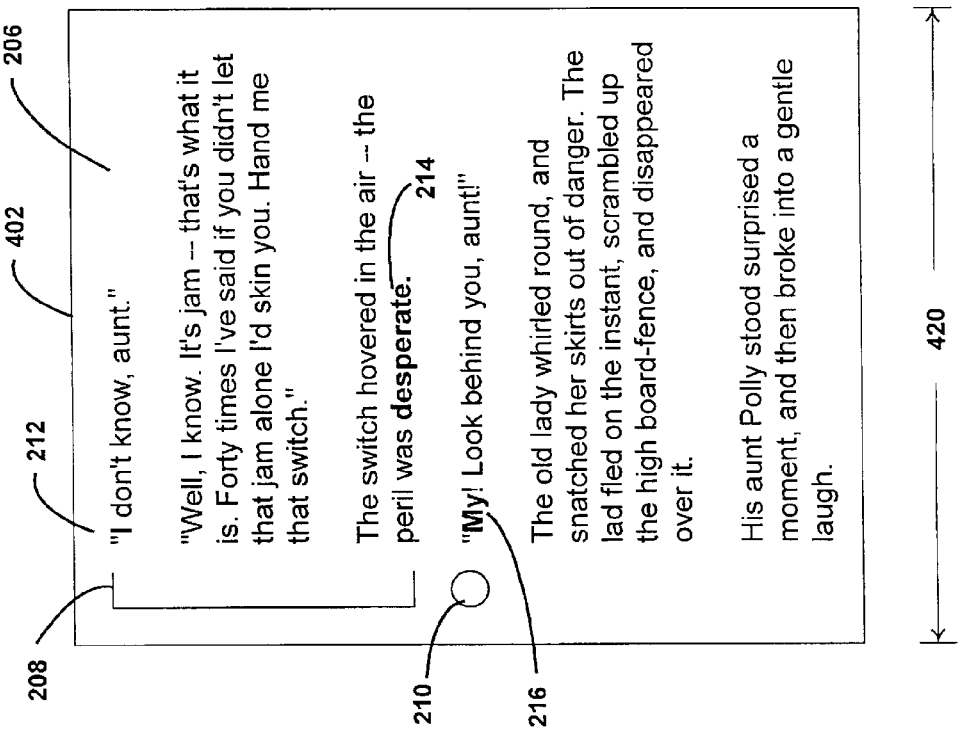
FIG. 5 depicts a PDL page resulting from the operation of yet another implementation of the present invention.
Figure 6:
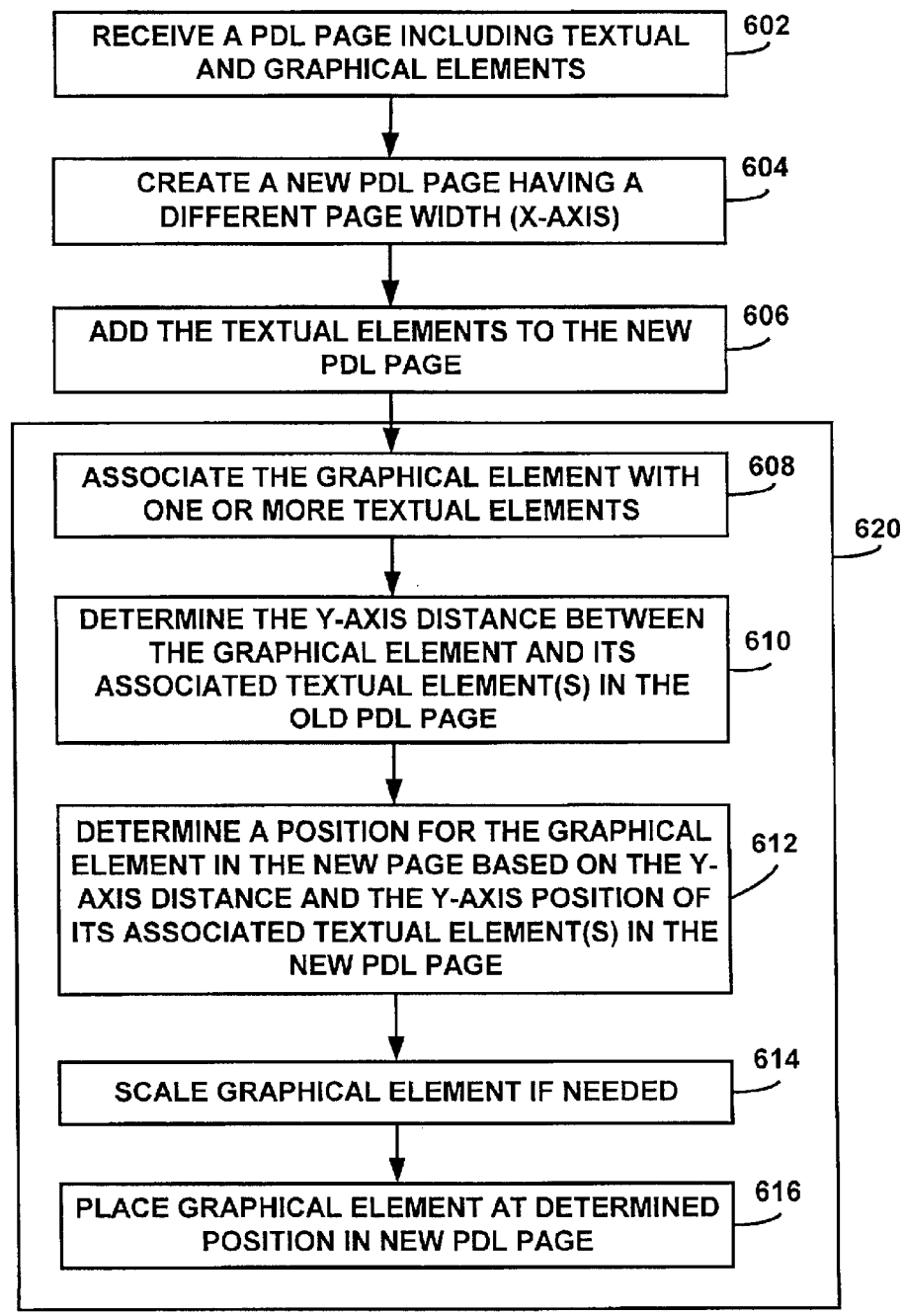
FIG. 6 is a flowchart depicting a process for reflowing a PDL page.

FIG. 5 shows a PDL page 502 resulting from the operation of another implementation of the present invention. According to this implementation, the width of the PDL page and the font size of its textual elements are increased. Referring to FIGS. 2 and 6/5, the page width 520 of new page 502 is chosen to be narrower than the page width 220 of original page 202. In addition, the font size of the textual elements 206 has been increased from 12 points to 14 points. Therefore, the length of the page 502 is greater than the length of page 202.

The Y-axis position of anchor 216 has also increased. Therefore, the Y-axis position of associated graphical element 210 is increased so that anchor 216 and graphical element 210 are aligned on the Y-axis. In addition, the Y-axis distance between anchors 212 and 214 has increased. Therefore, corresponding graphical element 208 is stretched to span the distance between anchors 212 and 214.

FIG. 6 is a flowchart depicting a process for reflowing a PDL page. According to this process, only the width of the PDL page is changed. The size of the textual elements within the PDL page remains constant. In another implementation, the size of the textual elements is increased while the page width is unchanged, as shown in FIG. 4. In another implementation, both the page width and the font size of the textual elements are changed, as shown in FIG. 5.

A PDL page is received in step 602. The PDL page includes page objects and including textual and graphical elements. In step 604, the process creates a new PDL page having a page width that differs from that of the received original PDL page. Note that all of the implementations maintain the spatial relationship between the textual and graphical elements.

In one implementation, two or more new PDL pages are created. The textual elements are added to the new PDL page in step 606. Next sub-process 620 is repeated for each graphical element.

The graphical element is associated with one or more textual elements in step 608. Then the process determines a Y-axis difference between the position of the graphical element and a position of each associated textual element, as shown in step 610. This step is useful when a graphical element and its associated textual element do not have the same Y-axis position.

In one implementation, the Y-axis positions of each textual element in the original PDL page and the new PDL page are recorded in a "Y-map." An exemplary Y-map is shown in Table 1. Table 1 is a Y-map between page 202 of FIG. 2 and page 302 of FIG. 3. Table 1 presents the Y position in the old page (page 202) and the Y position in the new page (page 302) for the anchor textual elements. In another implementation, the Y-map records positions for each textual element. Referring to Table 1, it is seen that the textual element "I" (anchor 212) is at a Y-axis position of 0.25 in both the old and new pages. However, the word "desperate" (anchor 214) has moved by half an inch. Similarly, the word "My" (anchor 216) has moved by ¾ of an inch.

TABLE 1

| Textual Element | Y Position in Old Page | Y Position in New Page |
| --- | --- | --- |
| I | 0.25 | 0.25 |
| desperate | 1.75 | 2.25 |
| My | 2.00 | 2.75 |

A position for the graphical element in the new page is then determined based on the Y-axis position of the associated textual element(s) in step 612. For example, the position of graphical element 210 in page 302 is determined based on the Y-axis position of its associated textual elements (anchor 216) in page 302. Referring to the Y-map of Table 1, it is seen that the Y-axis position of anchor 216 is 2.75 inches. Therefore, assuming that the Y-axis difference between graphical element 210 and anchor 216 is zero, the position for graphical element 210 in page 302 is determined to be 2.75 inches along the Y-axis. If necessary, the graphical element is scaled (that is, stretched) in step 614. For example, referring to FIG. 3, graphical element 208 is stretched because its associated anchors 212 and 214 are further apart than in the original page. Finally, the graphical element is placed at the position determined in step 612, as shown in step 616.

The present invention is also useful in documents having multiple columns. Each column is simply treated according to the process of FIG. 6 within its bounding box in the same way the PDL page 202 is treated within page 302. Implementations of the present invention include three variations to handle different multi-column cases. For example, consider a two-column case with a vertical line-art element between the two columns. Each column has a Y-map, so there are two Y-maps. The vertical line-art element is associated with textual elements in both columns. When reflowing the line-art element, it must be decided which Y-map to use. In one implementation, the Y-map having the maximum Y value for the line-art element is used. Other implementations can be used, as would be apparent to one skilled in the relevant arts.

In a multiple column case, where a single text-line or line-art element intersects the X-axis extent of a set of columns, that intersection is considered to be a "fault line." This fault line is used as a break, so that subsequent text (that is, text that has a greater Y-axis position than the fault line) is considered to be a new column.

An implementation of the present invention handles hyphenation and ligatures according to the following method. The process hyphenates a word at a line-end in the new page if the original word had a soft hyphen at that point. Similarly, such a word can be unhyphenated when it is no longer at a line-end in the new page. In implementations in which the font size of the text elements is changed, the positioning of the text lines is addressed. In one implementation, all vertical white space is retained. That is, the inter-paragraph vertical gap is retained, and within the paragraph, the inter-line vertical gap is retained.

In the implementation discussed above, the graphical elements can be simple line art elements, images, or combinations of line art elements, images and text, such as captions. PDF documents often contain complex illustrations including multiple graphical elements, such as strokes and fills, images, and even textual elements, such as captions. Humans are very good at identifying which components belong to a particular illustration. However, in order to successfully reflow a document containing a complex illustration, it is desirable to perform this process automatically. After an illustration is identified, it can be reflowed into the new page according to the process described above.

Figure 7:
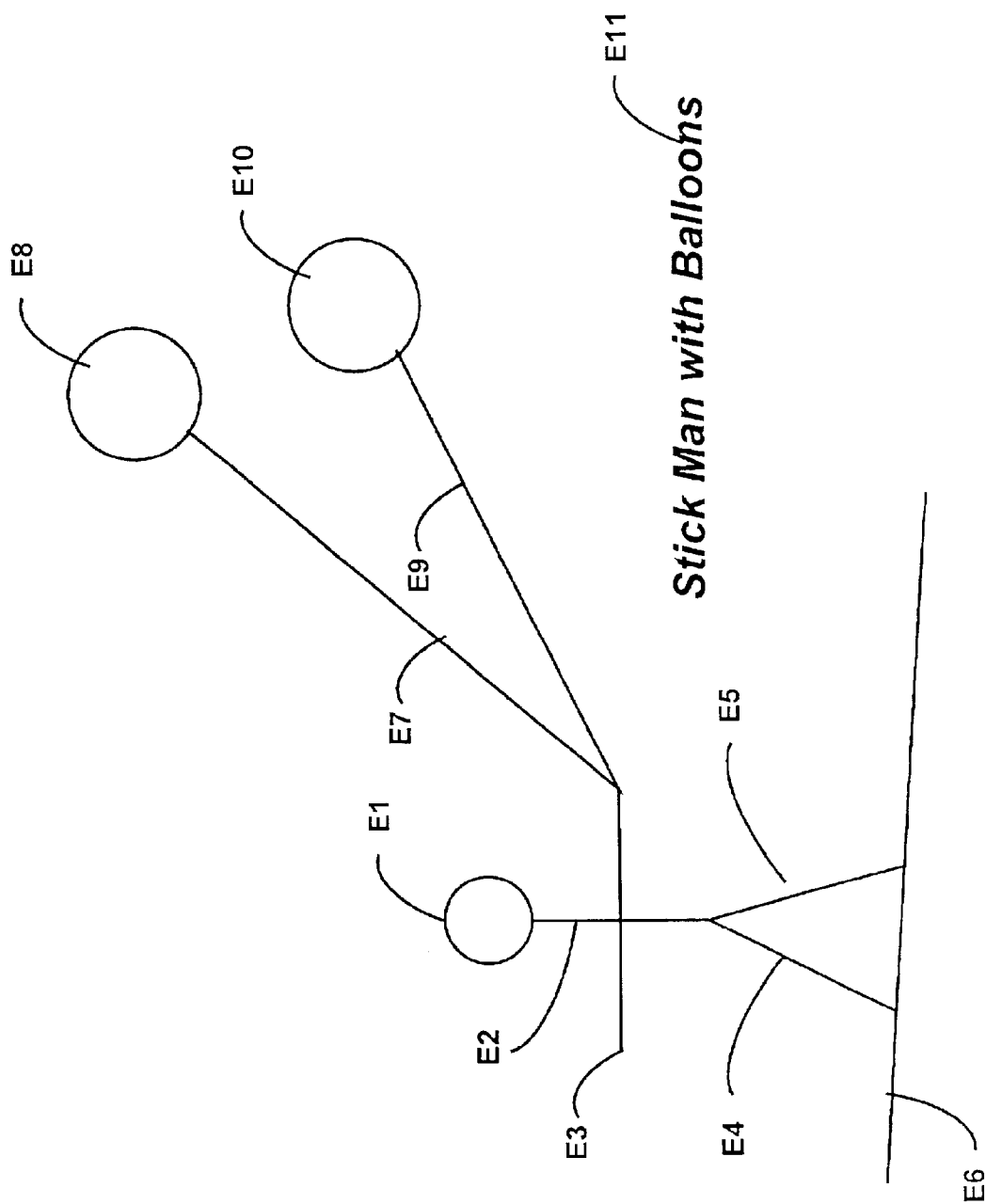
FIGS. 7–10 show the results of the process of FIG. 6 when applied to a PDL page containing eleven PDL elements.
Figure 8:
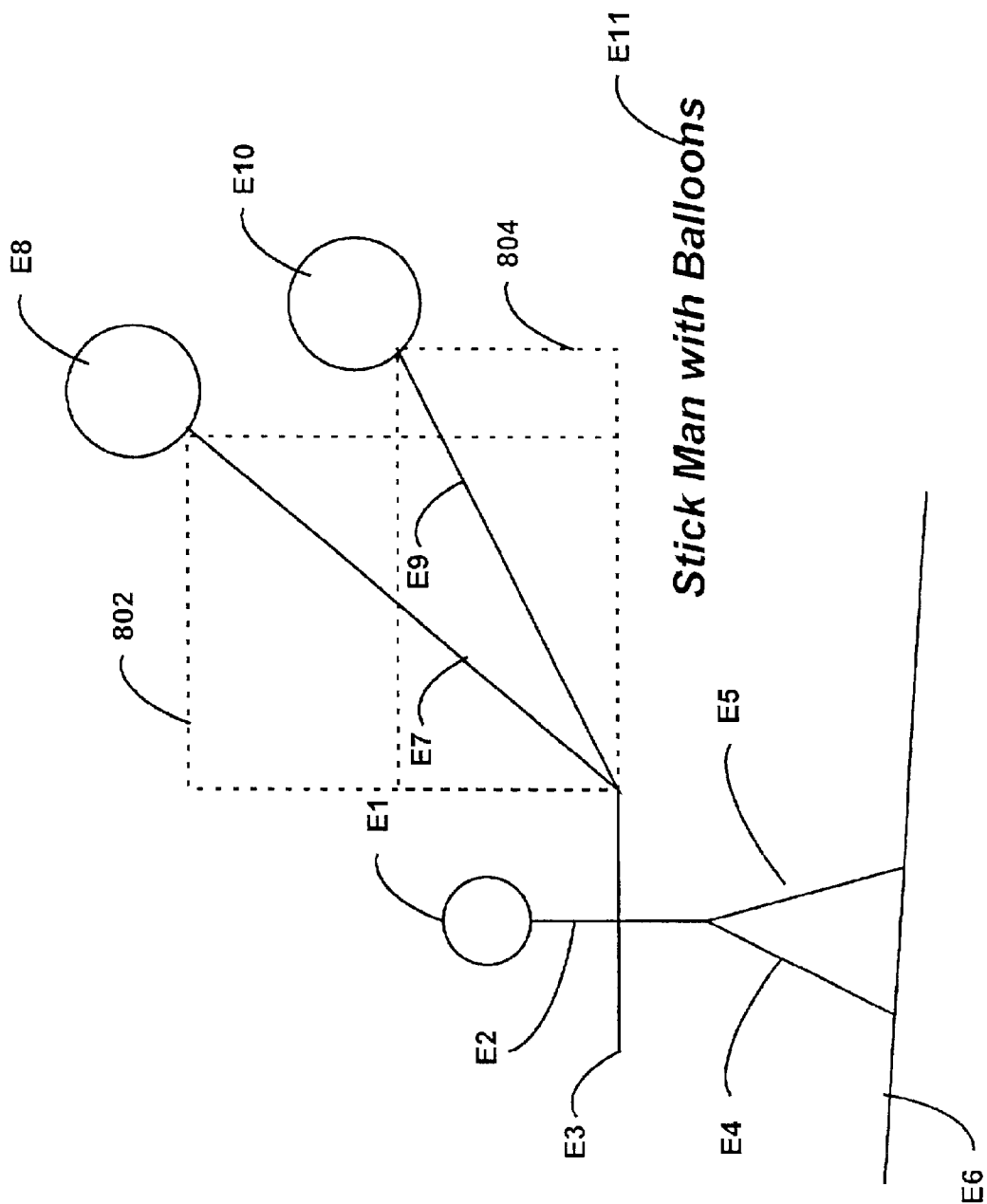
Figure 9:
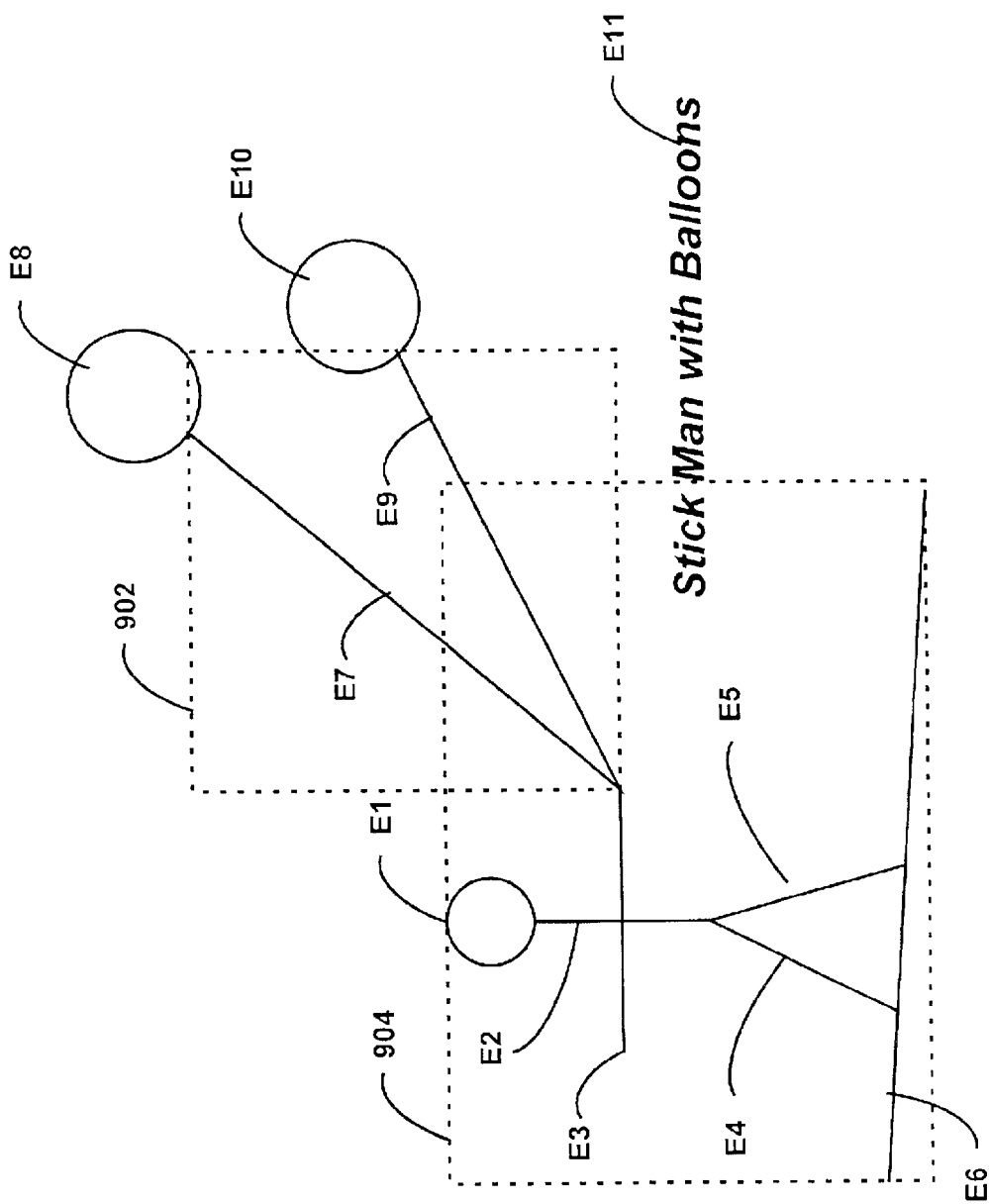
Figure 10:
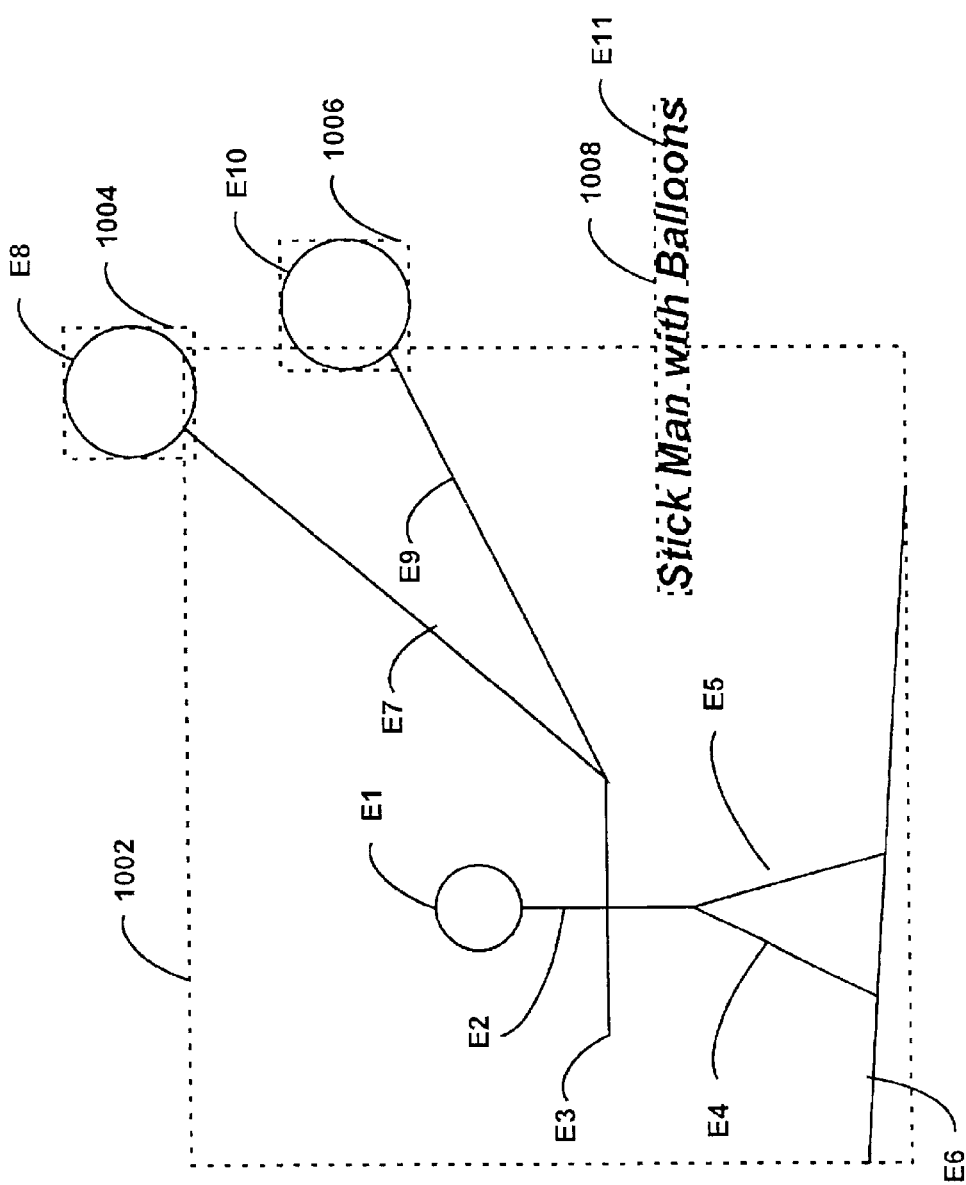

FIGS. 8–10 graphically depict combining page objects to form a single illustration. FIG. 7 represents a PDL page containing eleven PDL elements. PDL elements E1, E2, E3, E4, E5 and E6 are line art elements forming a "stick man" standing on the ground. PDL elements E7 and E9 are line art elements representing balloon tethers. PDL elements E8 and E10 are images representing balloons. PDL element E11 is a text element that is the caption for the drawing.

The process begins by coalescing line art elements to form illustrations. Each line art element is assigned a "bounding box." In the described implementation, each bounding box is rectilinear having sides parallel to the edges of the PDL page. Referring to FIG. 8, PDL element E7 is enclosed by bounding box 802, and PDL element E9 is enclosed by bounding box 804.

According to the process, when line art elements have overlapping bounding boxes, they are combined to form a single illustration. This illustration, I2, contains the elements E7 and E9 and can be represented by $$I2 = E7, E9 \quad (1)$$

The drawing of FIG. 7 is represented by a sequential collection of PDL elements given by equation 1. Assume that PDL elements forming the stickman standing on the ground have already been collected to form an illustration I1 given by $$I1 = E1, E2, E3, E4, E5, E6 \quad (2)$$

The sequence of PDL elements, from first to last, associated with an illustration is referred to as its "range." The PDL representation of the drawing of FIG. 7 is given below with the range of illustrations I1 and I2 underlined.

$$PDL = E1, E2, E3, E4, E8, E6, E7, E8, E9, E10, E11 \quad (3)$$

Note that, although element E8 is not part of illustration I2, it falls within the range of illustration I2. The treatment of such "gaps" in range is described below.

The process recursively joins line-art elements to form illustrations. Referring to FIG. 9, illustration I2 has been enclosed in bounding box 902, and illustration I1 has been enclosed in bounding box 904. Because bounding boxes 902 and 904 overlap, the process coalesces the contained line-art elements to form an illustration I3 given by equation 6.

$$I3=E1, E2, E3, E4, E8, E6, E7, E9 \quad (4)$$

The PDL range of illustration I3 then runs from E1 to E9. The PDL sequence for FIG. 9 is given below with the range of illustration I3 underlined.

$$PDL=E1, E2, E3, E4, E5, E6, E7, E8, E9, E10, E11 \quad (5)$$

The process next seeks to fill gaps in the range such as that represented by element E8. At this point, all of the line-art elements in the PDL page have been coalesced to form illustrations. Now the process seeks to combine those illustrations with other PDL elements such as images and text. The first step of this process is to fill the gaps in the PDL ranges of the line-art illustrations. Referring to FIG. 10, PDL element E8 is an image that lies within the range of illustration I3. The process combines a PDL element with an illustration if it lies within the PDL range of that illustration and the bounding boxes of the illustration and the PDL element overlap. Referring to FIG. 10, illustration I3 has been enclosed in a bounding box 1002, and image E8 has been enclosed within a bounding box 1004. Bounding boxes 1002 and 1004 overlap. Therefore, element E8 is combined with illustration I3. Illustration I3 now combines all of the elements from E1 to E9 as shown below.

$$I3=E1, E2, E3, E4, E8, E6, E7, E8, E9 \quad (6)$$

The PDL representation of FIG. 10 is given below, with the range of I3 underlined.

$$PDL=E1, E2, E3, E4, E5, E6, E7, E8, E9, E10, E11 \quad (7)$$

The process then seeks to combine PDL elements that are adjacent to the range of an illustration. A PDL element will be combined with an illustration when it is adjacent to the illustration in the PDL sequence and the bounding boxes of the illustration and the PDL element overlap. Referring to equation 9, we see that image E10 is adjacent to the range of illustration I3. Referring to FIG. 10, we see the bounding box 1006 of image E10 and the bounding box 1002 of illustration I3 overlap. Therefore, image E10 is combined with illustration I3. As a result, illustration I3 is given by $$I3=E1, E2, E3, E4, E5, E6, E7, E8, E9, E10 \quad (8)$$

The PDL representation of the drawing is then given by $$PDL=E1, E2, E3, E4, E5, E6, E7, E8, E9, E10, E11 \quad (9)$$

Referring to equation 11, it is seen that text element E11 is adjacent to the range of illustration I3. Referring to FIG. 10, it is seen that the bounding box 1008 of element E11 and bounding box 1002 illustration I3 overlap. Therefore, text element E11 is combined with illustration I3. Illustration I3 has been given by $$I3=E1, E2, E3, E4, E5, E6, E7, E8, E9, E10, E11 \quad (10)$$

The PDL range of the drawing has been given by $$PDL=E1, E2, E3, E4, E5, E6, E7, E8, E9, E10, E11 \quad (11)$$

It is seen that all of the elements within the drawing have now been combined to form a single illustration.

Figure 11:
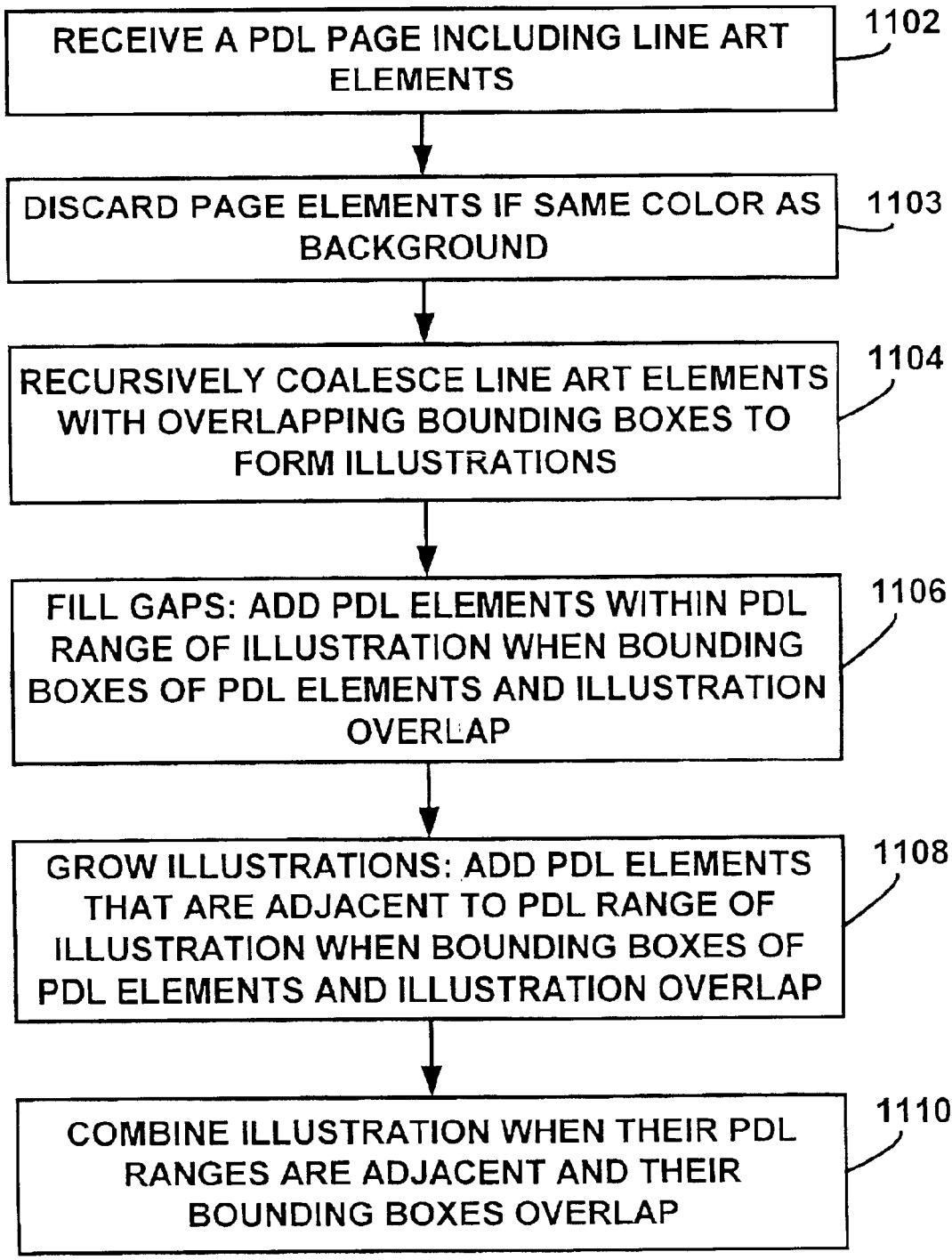
FIG. 11 depicts a process for forming illustrations.

FIG. 11 depicts a process for forming illustrations according to an implementation of the present invention. A PDL page is received at step 1102. The PDL page includes page objects including line-art elements. The page objects can also include other sorts of PDL elements such as images and text elements. Each page object is associated with a PDL element range that includes at least one PDL element. It is possible that an illustration generated in this way is simply part of a background. Therefore, if a page element illustration is the sane color as the background, it is discarded in step 1103.

The line-art elements within the PDL page are recursively coalesced to form illustrations at step 1104. The first recursion includes combining two line-art elements when their bounding boxes overlap to form an illustration. Following recursions include combining the illustration and a line-art element when their bounding boxes overlap to form the next illustration.

As described above, the range of an illustration may include PDL elements that are not part of the illustration. These PDL elements represent "gaps" in the PDL range. These "gaps" are located at step 1105. Each such "gap" is tested to determine whether it should be joined with the illustration at step 1106. A PDL element within the range of an illustration is combined with that illustration when the bounding boxes of the element and the illustration overlap.

The process then tests PDL elements that are adjacent to the ranges of the illustrations to determine whether they should be joined with those illustrations in step 1108. In one implementation, only those elements that are not already a part of another illustration are tested. A PDL element that is adjacent to the range of an illustration is combined with that illustration when the bounding boxes of the element and illustration overlap. This step is also performed recursively to "grow" the illustrations as the range of each illustration increases.

The process then tests the illustrations to determine whether any of them should be joined to form a single illustration in step 1110. Illustrations are combined when their PDL ranges are adjacent and their bounding boxes overlap.

Each PDL range that results from this process is a separate illustration. Each illustration is treated as a separate graphical element in the reflow process described above.

Figure 12:
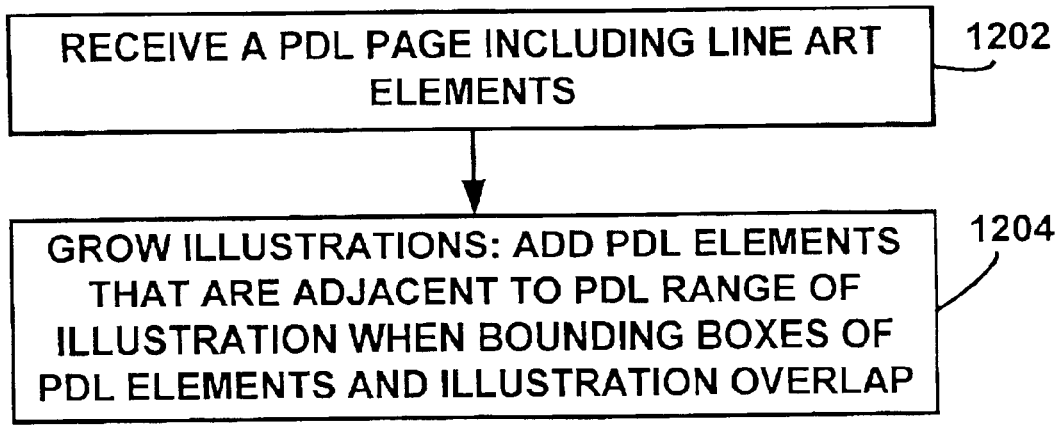
FIG. 12 is a flowchart depicting an alternative process for forming illustrations.

FIG. 12 is a flowchart depicting a process for forming illustrations according to another implementation of the present invention. A PDL page is received at step 1202. The PDL page includes page objects including line-art elements. The page objects can also include other sorts of PDL elements such as images and text elements. Each page object is associated with a PDL element range that includes at least one PDL element.

The process then tests PDL elements that are adjacent to the ranges of the illustrations to determine whether they should be joined with those illustrations in step 1204. In one implementation, only those elements that are not already a part of another illustration are tested. A PDL element that is adjacent to the range of an illustration is combined with that illustration when the bounding boxes of the element and illustration overlap. This step is also performed recursively to "grow" the illustrations as the range of each illustration increases.

According to one implementation, each illustration is classified for treatment during reflow. Illustrations that lie within one line of a paragraph are classified as character surrogates. A character surrogate is an illustration that functions as a text character. Character surrogates are treated as text elements during reflow. Illustrations that lie within the bounding box of a paragraph, and which vertically overlap with two or more initial lines, and which are to the left of all the characters in those lines, are classified as "illuminated letters." Illuminated letters are reflowed at the upper left of the paragraph, with the text elements of the paragraph flowed to the right and below the illustration.

Illustrations that lie directly above (or below) a paragraph are reflowed to lie directly above (or below) that paragraph. Illustrations that do not fit within the reflow bounding box are scaled to fit within that bounding box.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer program product, tangibly stored on a computer-readable medium, for reflowing a page, the product comprising instructions operable to cause a programmable processor to:

receive a page represented in a page description language, the page including a plurality of columns of text positioned side-by-side on the page, each of the plurality of columns having a width and a length, the page further including a graphical element having a vertical position on the page, adjacent to a vertical side of one of and outside each of the columns;

for each of the plurality of columns, associate an item of text in the column with the graphical element, the item and the graphical element having a spatial relationship in that the item has a vertical position corresponding to the vertical position of the graphical element;

for at least one of the plurality of columns, change a size of the text, the width of the column, or both so that the relationship between the size of the text and the width of the column is changed, and then reflow text in the plurality of columns so that the item of text in each of the columns has a new vertical position as a result of the reflow;

for each of the items, calculate a change in vertical position resulting from the reflow; and reposition the graphical element on the page according to the new vertical position of the item of text having the greatest change in vertical position.

2. The product of claim 1, wherein the graphical element has a vertical extent defined by an upper vertical position and a lower vertical position, the vertical position of one of the items corresponds to the upper vertical position, and the item is a first item, the product further comprising instructions to:

associate, with the graphical element, a second item of text in the column of the first item, the second item having, before the reflow, a vertical position corresponding to the lower vertical position, the second item having a new vertical position as a result of the reflow; and scale the graphical element, the scaling being based on the new vertical position of the first item and the second item.

3. The product of claim 2, wherein instructions to scale include instructions to scale in the vertical direction.

4. The product of claim 2, further comprising:

define a map that indicates a change in vertical positions of the first and second items, the change resulting from the reflow, the map indicating pre-reflow and post-reflow vertical positions of the first and second items.

5. The product of claim 1, further comprising instructions to:

identify columns that are positioned top-to-bottom and separated by line art as separate columns when reflowing text.

6. The product of claim 1, further comprising instructions to:

insert a hyphen at the end of a line of text when the word at the end was separated by reflow and there is a soft hyphen at the position where the hyphen is to be insert; and maintain a hyphen in a word when the word is no longer separated.

7. The product of claim 1, further comprising instructions to:

replicate ligatures when reflowing text.

8. The product of claim 1, wherein:

the graphical element is line art.

9. The product of claim 1, wherein:

at least one of the item, of text is one of a character or a word.

10. A method for reflowing a page, comprising:

electronically receiving a page represented in a page description language, the page including a plurality of columns of text positioned side-by-side on the page, each of the plurality of columns having a width and a length, the page further including a graphical element having a vertical position on the page, adjacent to a vertical side of one of and outside each of the columns;

for each of the plurality of columns, associating an item of text in the column with the graphical element, the item and the graphical element having a spatial relationship in that the item has a vertical position corresponding to the vertical position of the graphical element;

for at least one of the plurality of the columns, changing a size of the text, the width of the column, or both so that the relationship between the size of the text and the width of the column is changed, and then reflowing text in the plurality of columns so that the item of text in each of the columns has a new vertical position as result of the reflow;

for each of the, items calculating a change in vertical position resulting from the reflow; and repositioning the graphical element on the page according to the new vertical position of the item of text having the greatest change in vertical position.

11. The method of claim 10, wherein the graphical element has a vertical extent defined by an upper vertical position and a lower vertical position, the vertical position of one of the items corresponds to the upper vertical position, and the item is a first item, the method further comprising:

associating, with the graphical element, a second item of text in the column of the first item, the second item having, before the reflow, a vertical position corresponding to the lower vertical position, the second item having a new vertical position as a result of the reflow; and scaling the graphical element, the scaling being based on the new vertical position of the second item.

12. The method of claim 11, wherein scaling includes scaling in the vertical direction.

13. The method of claim 11, further comprising:

defining a map that indicates a change in vertical positions of the first and second items of text, the change resulting from the reflow, the map indicating pre-reflow and post-reflow vertical positions of the first and second items.

14. The method of claim 10, further comprising:

identifying columns that are positioned top-to-bottom and separated by line art as separate columns when reflowing text.

15. The method of claim 10, further comprising:

inserting a hyphen at the end of a line of text when the word at the end was separated by reflow and there is a soft hyphen at the position where the hyphen is to be insert; and maintaining a hyphen in a word when the word is no longer separated.

16. The method of claim 10, further comprising:

replicating ligatures when reflowing text.

17. The method of claim 10, wherein:

the graphical element is line art.

18. The method of claim 10, wherein:

at least one of the items of text is one of a character or a word.

19. The product of claim 1, wherein:

the page is one of a page in a structured document, a page in a PDF document, or a page represented in the PostScript page description language.

20. The method of claim 10, wherein:

receiving a page includes receiving one of a page in a structured document, a page in a PDF document or a page represented in the PostScript page description language.

* * * * *

UNITED STATES PATENT AND TRADEMARK OFFICE
CERTIFICATE OF CORRECTION

PATENT NO. : 6,915,484 B1
DATED : July 5, 2005
INVENTOR(S) : Richard L. Sites and Robert M. Ayers It is certified that error appears in the above-identified patent and that said Letters Patent is hereby corrected as shown below:

Column 12,
Line 61, delete "item," and insert -- items --;

Column 13,
Line 17, after "as", insert -- a --;
Line 19, delete "the, items" and insert -- the items, --;

Column 14,
Line 31, after "PDF document", insert a comma.

Signed and Sealed this

Eighteenth Day of October, 2005

JON W. DUDAS
*Director of the United States Patent and Trademark Office*